C. L. WITSAMAN.
INNER TUBE.
APPLICATION FILED MAR. 5, 1915.

1,263,302.

Patented Apr. 16, 1918.

Witness:
John W. Kittredge
A. L. Ely

Inventor
Clement L. Witsaman.
By C. C. Linthicum
Attorney

UNITED STATES PATENT OFFICE.

CLEMENT L. WITSAMAN, OF SUMMIT COUNTY, OHIO, ASSIGNOR TO THE FIRESTONE TIRE & RUBBER COMPANY, OF AKRON, OHIO, A CORPORATION OF OHIO.

INNER TUBE.

1,263,302.    Specification of Letters Patent.    Patented Apr. 16, 1918.

Application filed March 5, 1915. Serial No. 12,286.

*To all whom it may concern:*

Be it known that I, CLEMENT L. WITSA-MAN, a citizen of the United States, residing in the county of Summit and State of Ohio, have invented certain new and useful Improvements in Inner Tubes, of which the following is a specification.

The object of my invention has been to make an inner tube for tires which will be as nearly puncture-proof and self-heating as it is possible to make it without depriving the tube of any resiliency and without introducing a textile material into the tube. My invention also has for one of its objects the method of making the tube.

It is well known that rubber under compression possesses the property of closing any holes which may be formed in it by expansion of the rubber. It is also common knowledge that the red rubber, or rubber containing antimony compounds and enough sulfur to chemically combine with the rubber but not enough to leave any free sulfur after curing, commonly known as "tube stock" is highly resilient and will keep its resiliency for a long period, not being subject to further vulcanization during use. It is also well known that gray rubber, commonly known as "tread stock" consists of rubber heavily compounded without any antimony compounds, is tough, not easily punctured and when under compression possesses to a high degree the property of closing up any punctures formed therein. With these facts in mind it has been my purpose to construct a puncture-proof and self-healing tube by making use of the properties of the two kinds of stock mentioned, but I do not wish to be limited to the particular tube and tread stocks mentioned, for any rubber compounds which possess the requisite resiliency and toughness will come within the scope of my invention.

A tube constructed in accordance with my invention will offer sufficient resistance to any ordinary puncturing element to prevent puncture owing to the presence of a tougher rubber than is ordinarily used in tube manufacturing. When, however, an unusual puncturing element does pass through the tough rubber forming part of the tube, the puncture caused thereby will heal up immediately of itself upon withdrawal of the puncturing element, owing to the compression under which the tough rubber is held.

In order to carry out my invention I have devised an inner tube and a process of making same which is illustrated in the accompanying drawings, in which like reference numerals refer to like parts, and in which.

Figure 1:
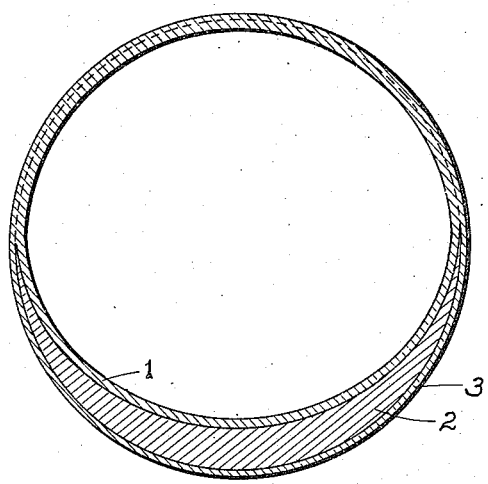
Figure 1 is a cross section of my tube prior to its removal from a pole on which it is vulcanized.
Figure 2:
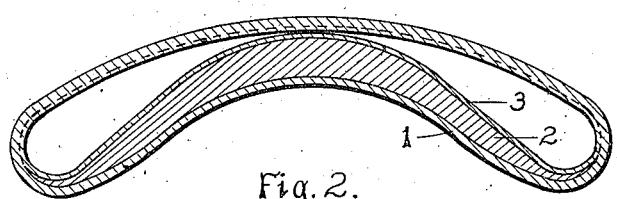
Fig. 2 is a cross section of my tube in the position it naturally assumes when removed from the pole.
Figure 3:
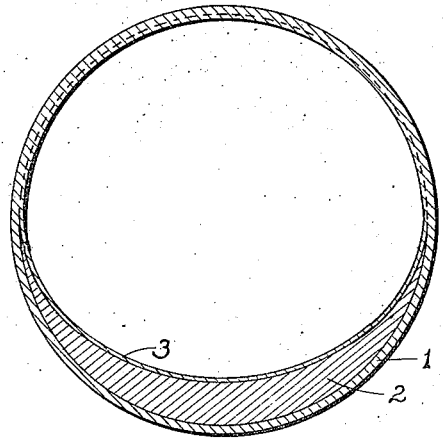
Fig. 3 is a cross section of my tube as it appears when inflated in use.

In making my tube the operator wraps upon a mandrel a double ply of tube stock 1. He then places over the part of the tube opposite the seam in the first layer a crescent shaped layer of tread stock 2. The portion of the tube on which the tread stock is placed is intended to come next to the tread of the tire in use and cover about one-half of the circumference of the cross section of the tube. Over this layer he then places a single ply of tube stock 3. The completed tube is then removed from the mandrel and blown on to a curing pole on which it is cured. After curing the tube is removed from the pole by turning inside out, or peeling in stocking fashion. This places the two ply layer of tube stock on the outside of the tube and as it is smaller in circumference its tendency to contract to original size and its resilience places the layer of tread stock under a certain degree of compression. This gives the layer of tread stock the puncture healing property which is also increased because of the fact that a tougher and less resilient rubber having been forced in one shape by curing will have a greater tendency to assume that shape if forced in to any other shape than a more resilient softer tube. This is illustrated in Fig. 2 of drawing in which is shown the shape my tube assumes upon being removed from the curing pole. Upon inflating the tire the tread portion is compelled to take a reversed curvature from that which it is its natural tendency to assume, which places the tread stock under additional compression.

It is, therefore, evident that the compression in the tread stock is caused by two factors. First, the contraction of the outer layer of very resilient rubber and, second, by the internal compression in the tread stock due to its tendency to assume a reverse curvature from that which it is given when in use. It is these two factors that give my tube its puncture healing property to such a large extent, and the selection of the different stocks to obtain the two factors entering in the compression of the tread stock is believed to be one of the principal features of my invention. To get the greatest internal compression in the rubber due to any altering of shape and the tendency to return to the original shape, I use a tough, slightly resilient rubber, but to obtain the greatest external compression I use a highly resilient rubber such as the tube stock mentioned. The inner tube stock used is peculiarly suited to the work required of it as it does not "fatigue" easily, that is, its elasticity or "come back" is little affected by a tension strain of any considerable duration. For this reason the compression due to the contraction of the outer layer is held throughout the life of the tube. There is a tendency in all tubes to slowly increase in cross section during use, but this tendency is less in tube stocks of high resiliency. In use my tube has shown about the same increase in size that is shown in a tube made wholly of the more resilient tube stock. It would be expected that due to the presence of the tread stock this tube would show a greater permanent increase than one of tube stock alone, but the result demonstrated that the outer layer of tube stock restrained the less resilient tread stock from permanently increasing in size during use, more rapidly than itself.

It should also be noted that the presence of the tread stock in the tube will impair resiliency of the tube to some extent, but the exterior layer of the tube stock partially alleviates this condition, as it forms a cushion between the casing and the tread stock.

It has been proposed heretofore in making tubes to use either a complete layer or a strip of fabric on the inside of a tube and then by inversion put the fabric on the outside of the tube, placing any inner layer of rubber under compression. These processes have the disadvantage in the first instance of lack of resiliency, and in the second that owing to the unstretchable qualtiy of the fabric layer all the extension which takes place in the tube during inflation must come from the section of the tube which does not contain any fabric. This puts a strain on the points about the tube where the fabric ends, and tubes of this type are liable to rupture about the edges of the fabric. I also am aware that it has been proposed to cement one layer of rubber to another layer of rubber which is stretched out of its normal state, that is depending upon the return of the stretched rubber to normal to place the other layer under a compression. This, however, has the disadvantage that any puncture occurring in the stretched layer will have a tendency to spread. I overcome this disadvantage in my tube by reason of the fact that in use the external layer is very nearly in its normal state. In all tubes which rely on compression to obtain a puncture healing property and which are extensible in their compressed areas, the compression is neutralized by the extension due to inflation. This is particularly true in tubes which have soft rubber in the compressed state, as soft rubber will require less force to compress it to a given volume and its loss of compression upon increase in size at inflation will be more marked. In my tube, however, the minimum loss of compression is present which is compatible with a tube resilient throughout. This is owing to the comparative inextensibility of the compressed layer.

Details of my invention as set forth might be changed without departing from the substance thereof and without sacrificing any of its advantages.

What I claim is:

1. A puncture healing tube consisting of a compound structure of different rubber stocks, the stock of the outer layer having greater resilience than that of the inner layer; the puncture healing property being imparted by compression in the less resilient layer.

2. A tube consisting of a compound structure of layers of rubber stocks of different degrees of resiliency, the less resilient stock being held under compression by the more resilient, the tube being expansible at all points.

3. A tube consisting of a compound structure of layers of rubber stocks of different degrees of resiliency, the less resilient stock being located between two layers of the more resilient stock and held under compression by the more resilient stock, and by inflation of the tube.

4. A tube consisting of a compound structure of layers of rubber stocks of different degrees of resiliency, the less resilient stock being thickened at the wearing point, and located between a thick outer layer and a thin inner layer of the more resilient stock.

5. A tube composed of two layers of different rubber stocks, the outer layer being more resilient and the inner layer being tougher, the inner layer being held under compression by the outer layer, and by inflation.

6. A tube composed of two layers of different rubber stocks, the outer layer being more resilient and the inner layer being tougher, the inner layer being held under compression by the contraction of the outer layer, and by its tendency to assume a reverse curvature from that given it in use.

CLEMENT L. WITSAMAN.

Witnesses:
J. J. SHEA,
A. L. ELY.